(12) United States Patent
Yamamoto et al.

(10) Patent No.: US 6,503,427 B1
(45) Date of Patent: Jan. 7, 2003

(54) HEAT-RESISTANT POLYMER FOAM, PROCESS FOR PRODUCING THE SAME, AND FOAM SUBSTRATE

(75) Inventors: Takayuki Yamamoto; Amane Mochizuki; Takami Hikita; Tomohiro Taruno; Tomohide Banba; Mitsuhiro Kanada, all of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/588,240

(22) Filed: Jun. 6, 2000

(30) Foreign Application Priority Data

Jun. 7, 1999 (JP) .......................... 11-159831
Oct. 14, 1999 (JP) .......................... 11-293019

(51) Int. Cl.⁷ .................. B32B 15/08; C08J 9/14
(52) U.S. Cl. ................. 264/51; 264/53; 521/79; 428/458
(58) Field of Search ............... 264/51, 53; 521/79; 428/458

(56) References Cited

U.S. PATENT DOCUMENTS

| 4,629,745 A | 12/1986 | Hoki et al. ............... 764/51 |
| 4,943,594 A | 7/1990 | Ezawa et al. |
| 4,978,692 A | 12/1990 | Ezawa et al. |
| 5,034,171 A | * 7/1991 | Kiczek et al. ............. 264/51 |
| 5,116,883 A | * 5/1992 | Le May |
| 5,227,101 A | 7/1993 | Mahoney et al. ........... 264/51 |
| 5,670,102 A | * 9/1997 | Perman et al. ............ 264/51 |

FOREIGN PATENT DOCUMENTS

WO 92/17533 * 10/1992

OTHER PUBLICATIONS

Patent Abstracts of Japan, 07138402, May 30, 1995.

* cited by examiner

*Primary Examiner*—Morton Foelak
(74) *Attorney, Agent, or Firm*—Sughrue Mion, PLLC

(57) ABSTRACT

A heat-resistant polymer foam is disclosed which has excellent heat resistance, a fine cellular structure, and a low apparent density. The heat-resistant polymer foam comprises a heat-resistant polymer having a glass transition point of 120° C. or higher, e.g., a polyimide or polyether imide, and has an average cell diameter of from 0.01 $\mu$m to less than 10 $\mu$m. This heat-resistant polymer foam can be produced by, for example, impregnating a heat-resistant polymer under pressure with an non-reactive gas such as carbon dioxide, which is in, e.g., a supercritical state, reducing the pressure, and then heating the polymer at a temperature exceeding 120° C. to foam the polymer.

4 Claims, 2 Drawing Sheets

HEAT-RESISTANT POLYMER FOAM, PROCESS FOR PRODUCING THE SAME, AND FOAM SUBSTRATE

FIELD OF THE INVENTION

The present invention relates to a polymer foam having fine cells and excellent heat resistance, a process for producing the same and a foam substrate. The polymer foam is exceedingly useful as, for example, an internal electrical insulator, cushioning material or heat insulator for electronic appliances and others, and the foam substrate is useful as a circuit substrate.

BACKGROUND OF THE INVENTION

Conventional general processes for foam production include chemical processes and physical processes. In the chemical processes, a compound (blowing agent) added to a polymer base is thermally decomposed and cells are formed by the resultant gas to obtain a foam. However, this foaming technique has a disadvantage that after the gas generation, a residue of the blowing agent tends to remain in the foam. This technique therefore poses a problem concerning fouling by corrosive gases or impurities especially when the foam is used as an electronic part or the like because fouling prevention is highly required in such applications.

On the other hand, a general physical process comprises dispersing a low boiling liquid (blowing agent) such as a chlorofluorocarbon or hydrocarbon into a polymer and then heating the polymer to volatilize the blowing agent, thereby forming cells. For example, U.S. Pat. No. 4,532,263 discloses a method for obtaining a foamed polyether imide or another foamed polymer using methylene chloride, chloroform, trichloroethane or the like as a blowing agent. However, this foaming technique has problems concerning the harmfulness of the substances used as a blowing agent and various influences thereof on the environment, including ozonosphere depletion. In addition, it is difficult to obtain with this technique a foam having fine cells uniform in diameter, although the technique is generally suitable for obtaining a foam having a cell diameter of several tens of micrometers or larger.

Recently, a technique for obtaining a foam having a small cell diameter and a high cell density was proposed which comprises dissolving a gas such as nitrogen or carbon dioxide in a polymer at a high pressure, subsequently releasing the polymer from the pressure, and heating the polymer to a temperature around the glass transition temperature or softening point of the polymer to thereby form cells. This foaming technique, in which nuclei are formed in a thermodynamically unstable state and are allowed to expand and grow to thereby form cells, has an advantage that a foam having a finely cellular novel structure is obtained. For example, application of this technique to a styrene resin having a syndiotactic structure is disclosed in JP-A-10-45936 (the term "JP-A" as used herein means an "unexamined published Japanese patent application"). Specifically, this reference discloses a method for obtaining a molded foam having closed cells with a cell size of from 0.1 to 20 $\mu$m. There is a description therein to the effect that this molded foam is useful as an electric circuit member. However, this molded foam deforms or bends when used at temperatures not lower than 100° C., because styrene resins having a syndiotactic structure generally have a glass transition point around 100° C. Consequently, applications of this molded foam are limited to a narrow range.

JP-A-6-322168 discloses a method which comprises heating a pressure vessel containing a thermoplastic polymer, e.g., a polyether imide, to or around the Vicat softening point of the polymer, impregnating the heated polymer with a gas in a supercritical fluid state, and then releasing the polymer from the pressure to obtain a porous foamed article having a low density. However, this method has the following drawback. Since the polymer is heated to or around the Vicat softening point thereof for impregnation with a gas in a high-pressure vessel, the gas readily expands upon pressure decrease because the polymer is in a molten state. The resultant foam hence has a cell size as large as about from 10 to 300 $\mu$m. In the case where this foam is laminated with a metal foil to produce a laminate for use as a circuit substrate, pattern formation on the metal foil side by etching is limited in the degree of pattern fineness. In addition, the foam is expected to further have a problem that chemicals used for the processing, such as a resist, an etchant, and a stripping fluid, infiltrate into pores of the foam to considerably reduce electrical reliability.

SUMMARY OF THE INVENTION

Accordingly, an object of the invention is to provide a heat-resistant polymer foam having excellent heat resistance, a fine cellular structure, and a low relative density.

Another object of the present invention is to provide a process for producing the heat-resistant polymer foam.

Still another object of the invention is to provide a foam substrate which has a metal foil where a fine pattern can be formed and which is useful as a circuit substrate having high electrical reliability.

As a result of intensive studies to accomplish the above objects, it has been found that a foam having excellent heat resistance and exceedingly fine cells is obtained by impregnating a heat-resistant polymer with a non-reactive gas such as carbon dioxide under pressure, reducing the pressure, and then heating the polymer at a specific temperature. The present invention has been completed based on this finding.

The present invention provides a heat-resistant polymer foam which comprises a heat-resistant polymer and has an average cell diameter of from 0.01 $\mu$m to less than 10 $\mu$m. The heatresistant polymer has a glass transition point of, e.g., 120° C. or higher. This heat-resistant polymer includes a polyimide, a polyether imide and the like.

The present invention further provides a process for producing a heat-resistant polymer foam which comprises impregnating a heat-resistant polymer with a non-reactive gas under pressure, reducing the pressure, and then heating the impregnated polymer at a temperature exceeding 120° C. to foam the polymer. The heating for foaming is preferably conducted at a temperature at which the heat-resistant polymer in an unfoamed state has a modulus of elasticity of $1 \times 10^7$ Pa or higher. The heat-resistant polymer to be foamed has a glass transition point of, e.g., 120° C. or higher. The heat-resistant polymer may be, e.g., a polymer selected from polyimides and polyether imides. The non-reactive gas is, for example, carbon dioxide. The heat-resistant polymer may be impregnated with the non-reactive gas in a supercritical state.

The present invention also provides a foam substrate which comprises a foamed resin layer comprising the heat-resistant polymer foam and a metal foil layer disposed on at least one side of the resin layer.

DETAILED DESCRIPTION OF THE INVENTION

Figure 1:
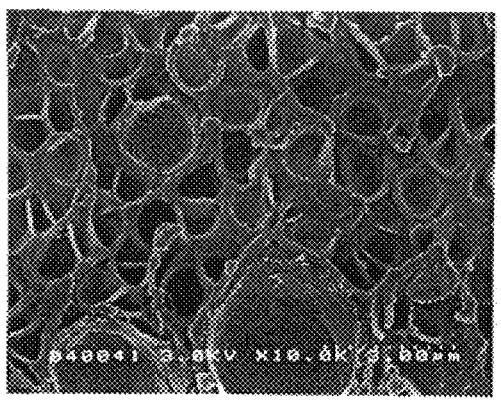
FIG. 1 is a scanning electron micrograph showing a sectional structure of the foamed sheet obtained in Example 1.
Figure 2:
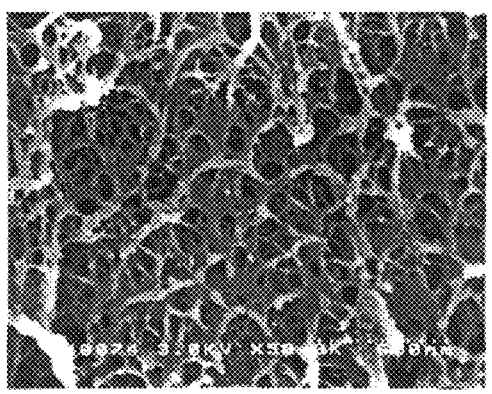
FIG. 2 is a scanning electron micrograph showing a sectional structure of the foamed sheet obtained in Example 2.
Figure 3:
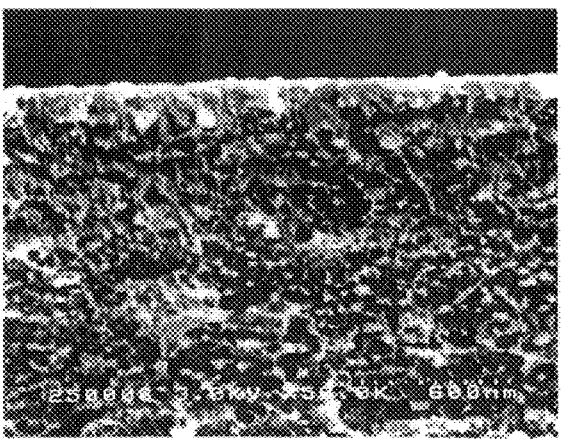
FIG. 3 is a scanning electron micrograph showing a sectional structure of the foamed sheet obtained in Example 3.
Figure 4:
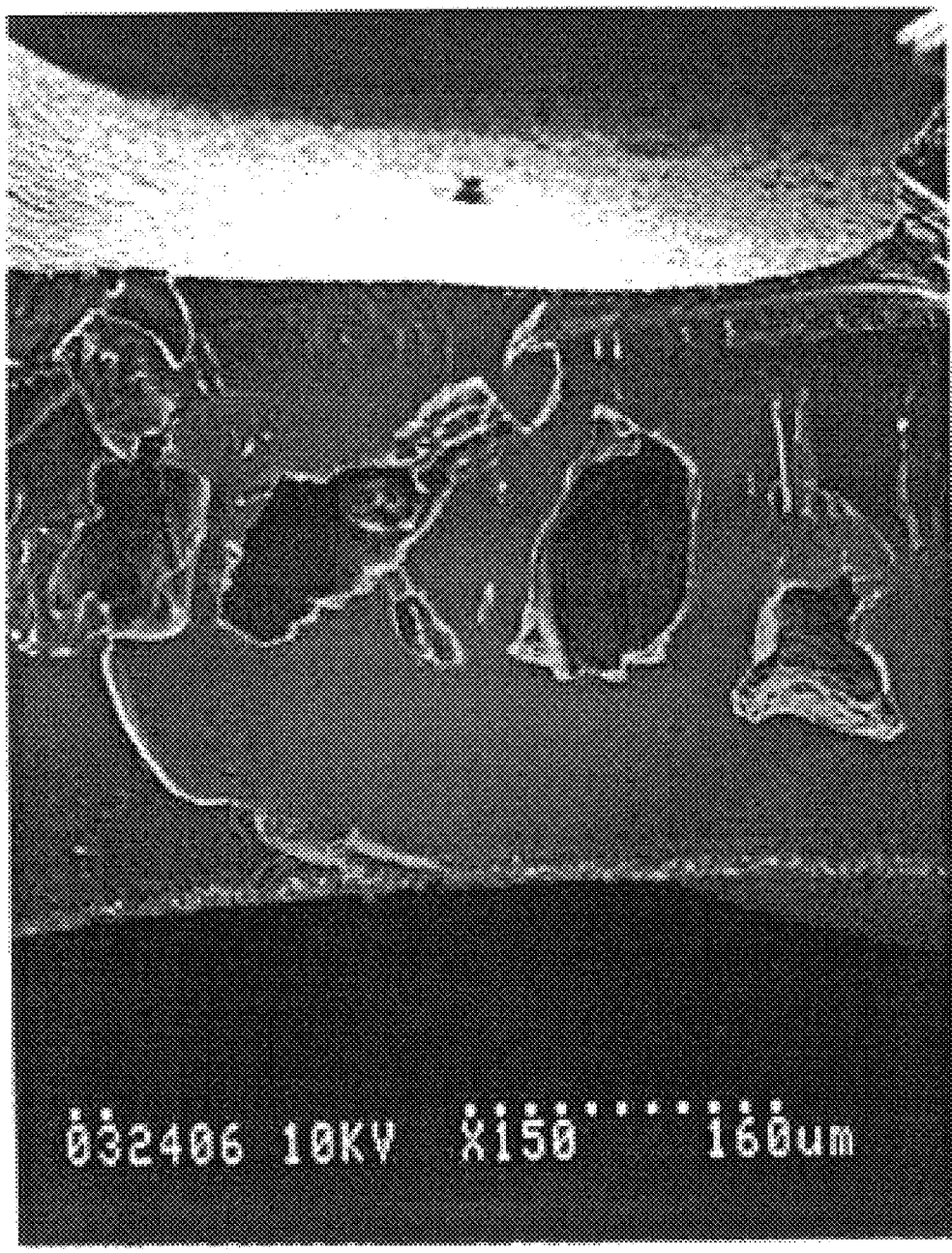
FIG. 4 is a scanning electron micrograph showing a sectional structure of the foamed sheet obtained in Comparative Example 1.

The polymer used as the material of the foam of the present invention is not particularly limited, and either amorphous and crystalline polymers can be used so long as it has heat resistance. Examples of the polymer include polypropylene, polyacetals, polyamides, polymethylpentene, polycarbonates, poly(butylene terephthalate), poly(ethylene terephthalate), poly(phenylene sulfide), polysulfones, polyethersulfones, polyetheretherketones, poly(vinylidene fluoride), polytetrafluoroethylene, poly(amide-imide)s, polyimides and polyetherimides. However, the polymer to be foamed should not be construed as being limited to these examples. Especially advantageous polymers have a glass transition point of 120° C. or higher. Such polymers can be used alone or as mixtures of two or more thereof. of the above polymers, polyimides and polyether imides are particularly preferably used. Polyimides can be obtained by the conventional methods. For example, a polyimide can be obtained by reacting an organic tetracarboxylic dianhydride with a diamino compound (diamine) to prepare a polyimide precursor (poly(amic acid)) and subjecting this polyimide precursor to dehydrocyclization.

Examples of the organic tetracarboxylic dianhydride include pyromellitic dianhydride, 3,3',4,4'-biphenyltetracarboxylic dianhydride, 2,2-bis(2,3-dicarboxyphenyl)-1,1,1,3,3,3-hexafluoropropane dianhydride, 2,2-bis(3,4-dicarboxyphenyl)-1,1,1,3,3,3-hexafluoropropane dianhydride, 3,3',4,4'-benzophenonetetracarboxylic dianhydride, bis(3,4-dicarboxyphenyl) ether dianhydride and bis (3,4-dicarboxyphenyl) sulfone dianhydride. These organic tetracarboxylic dianhydrides can be used alone or as mixtures of two or more thereof.

Examples of the diamino compound include m-phenylenediamine, p-phenylenediamine, 3,4'-diaminodiphenyl ether, 4,4'-diaminodiphenyl ether, 4,4'-diaminodiphenyl sulfone, 3,3'-diaminodiphenyl sulfone, 2,2-bis(4-aminophenoxyphenyl)propane, 2,2-bis(4-aminophenoxyphenyl)hexafluoropropane, 1,3-bis(4-aminophenoxy)benzene, 1,4-bis(4-aminophenoxy)benzene, 2,4-diaminotoluene, 2,6-diaminotoluene, diaminodiphenylmethane, 4,4'-diamino-2,2'-dimethylbiphenyl and 2,2-bis(trifluoromethyl)-4,4'-diaminobiphenyl.

The polyimide precursor is obtained by reacting an organic tetracarboxylic dianhydride with a diamino compound (diamine) in an approximately equimolar proportion usually in an organic solvent at 0 to 90° C. for about from 1 to 24 hours. Examples of the organic solvent include polar solvents such as N-methyl-2-pyrrolidone, N,N-dimethylacetamide, N,N-dimethylformamide and dimethyl sulfoxide.

The dehydrocyclization reaction of the polyimide precursor is conducted, for example, under heating or by the action of a dehydrocyclizing agent such as a mixture of acetic anhydride with pyridine. In general, polyimides are insoluble in organic solvents and have poor moldability. Consequently, in many cases the polyimide precursor is formed into a film or sheet or another form before being subjected to dehydrocyclization to obtain a polyimide molded article.

Besides the above method, a polyimide can be obtained by other methods including: a method of reacting an organic tetracarboxylic dianhydride with an N-silylated diamine to obtain silyl ester of a poly(amic acid) and cyclizing the resulting silyl ester of a poly(amic acid) under heating; a method of reacting an organic tetracarboxylic dianhydride with a diisocyanate; a method of reacting an organic tetracarboxylic dithiodianhydride with a diamino compound; and a method of subjecting an organic tetracarboxydiimide and a diamino compound to imide exchange reaction.

The polyether imides can also be obtained by the conventional method. However, commercially available polyether imide products may be used, such as Ultem (manufactured by General Electric Co.) and Superio (manufactured by Mitsubishi Plastics Industries Ltd.).

The heat-resistant polymer to be foamed in the process of the present invention may contain additives according to need. Those additives are not particularly limited in kind, and various additives for general use in expansion molding can be used. Examples the additives include nucleating agents for cell formation, nucleating agents for crystal formation, plasticizers, lubricants, colorants, ultraviolet absorbers, antioxidants, fillers, reinforcements, flame retardants and antistatic agents. Although the amount of such additives added is not particularly limited, they are desirably added in an amount used in the conventional molding of thermoplastic resins.

The gas used as a blowing agent in the process of the present invention is not particularly limited so long as it is non-reactive with the heat-resistant polymer and the polymer can be impregnated with the gas. Examples the gas include carbon dioxide, nitrogen gas and air. Those gases may be used alone or as mixtures of two or more thereof. Of those, carbon dioxide is particularly preferably used for the reason that the heatresistant polymer used as a material of foam can be impregnated with carbon dioxide in a larger amount and at a higher rate than other gases.

From the standpoint of increasing the impregnation rate of the polymer with the gas, the gas is preferably used in a supercritical state. For example, in the case of carbon dioxide, the solubility of carbon dioxide in the polymer can be greatly enhanced and an increased carbon dioxide concentration in the polymer is attainable, when the carbon dioxide, whose critical temperature and critical pressure are 31° C. and 7.4 MPa, respectively, is in a supercritical state having a temperature of 31° C. or higher and a pressure of 7.4 MPa or higher. Furthermore, the infiltration of a gas in a supercritical state has the following advantage. Since the gas concentration in the polymer is high, an abrupt pressure drop results in the generation of a large amount of cell nuclei. These cell nuclei grow to yield cells, and the cell density in this foam is higher than those in foams having the same porosity as that. Namely, exceedingly fine cells can be obtained.

The process of the present invention comprises: a gas impregnation step in which the heat-resistant polymer is impregnated with a non-reactive gas under pressure; a pressure reduction step (step of releasing the polymer from pressure) in which the pressure is reduced after the impregnation step; and a heating/foaming step in which the impregnated polymer is foamed by heating. Those steps may be conducted batchwise or continuously.

In a batch process, a foam can be produced, for example, in the following manner. A resin composition containing a heat-resistant polymer is extruded with an extruder, e.g., a single- or twin-screw extruder, to form a sheet containing the heat-resistant polymer as a base resin. Alternatively, a resin composition containing a heat-resistant polymer is uniformly kneaded with a kneading machine having blades of the roller, cam, kneader, or Banbury type, and the kneaded composition is press-molded in a given thickness by hot pressing or another means to form a sheet containing the heat-resistant polymer as a base resin. The unfoamed sheet thus obtained is placed in a high-pressure vessel. A non-reactive gas comprising, e.g., carbon dioxide, nitrogen or air is forced into the vessel to impregnate the unfoamed sheet with the non-reactive gas. At the time when the sheet has been sufficiently impregnated with the non-reactive gas, the pressure is reduced (usually to atmospheric pressure) to generate cell nuclei in the base resin. These cell nuclei are heated to grow cells. The sheet is then rapidly cooled with, e.g., cold water to terminate the cell growth and fix the shape. Thus, a heat-resistant polymer foam is obtained.

On the other hand, a continuous process can be conducted, for example, in the following manner. While a resin composition containing a heat-resistant polymer is kneaded with an extruder, e.g., a single- or twin-screw extruder, a non-reactive gas is forced into the extruder to sufficiently impregnate the resin with the non-reactive gas. The resin is then extruded to thereby reduce the pressure (usually to atmospheric pressure) and generate cell nuclei. The extrudate is heated to thereby grow cells and is then rapidly cooled with, e.g., cold water to terminate the cell growth and fix the shape. Thus, a heat-resistant polymer foam can be obtained.

In the gas impregnation step, the pressure can appropriately be selected, taking the kind of the gas, operation property, etc., into consideration. However, in the case of using carbon dioxide, for example, the pressure is about from 5 to 100 MPa (preferably about from 7.4 to 100 MPa). The temperature in the gas impregnation step varies depending on the kind of the gas used, the glass transition temperature of the polymer, etc., and can be selected in a wide range. However, too high temperature during impregnation tends to result in large cell diameter. For this reason, the temperature is preferably in the range of from 10° C. to lower than 120° C., or from 10° C. to lower than the glass transition temperature of the heat-resistant polymer.

An important feature of the process according to the present invention resides in that the temperature at which the polymer is heated in the heating/foaming step is higher than 120° C. If the temperature for heating is 120° C. or lower, it is difficult to obtain a foam having fine cells and a low relative density. The temperature for heating is preferably about 150° C. or higher, more preferably about 170° C. or higher. It is desirable that the temperature for heating be higher than the glass transition point of the heat-resistant polymer to be foamed.

In a preferred embodiment of the process according to the present invention, the temperature for heating is regulated to a temperature at which the heat-resistant polymer to be foamed has, in an unfoamed state, a modulus of elasticity (varying with temperature) of $1 \times 10^7$ Pa or higher (e.g., about from $1 \times 10^7$ to $1 \times 10^{11}$ Pa). Heating at a temperature in a range where the modulus of elasticity is lower than $1 \times 10^7$ Pa is undesirable in that the polymer becomes too soft and this results in cases where cells grow excessively to cause gas leakage, making it impossible to obtain a foam, and in cases where cell coalescence occurs, resulting in an extraordinarily reduced cell density. Also, there are cases where the polymer deforms during cell growth.

The shape of the heat-resistant polymer to be foamed is not limited to sheet or film, and the polymer may be a molded product of another shape, e.g., a columnar or spherical shape. Although a foam comprising a polyimide can be obtained by foaming a molded product, e.g., film, of a polyimide, it can also be obtained by thermally converting the polyimide precursor in a film or another molded form into a polyimide after the precursor has been foamed or during the foaming.

The heat-resistant polymer foam thus obtained not only has excellent heat resistance but has uniform and fine cells and a low relative density. For example, the average cell diameter of the foam is from 0.01 m to less than 10 μm, preferably about from 0.02 μm to 5 μm. The density of the heat-resistant polymer foam is, for example, from 0.4 to 1.4 g/cm$^3$, preferably about from 0.5 to 1.25 g/cm$^3$, although it varies depending on the kind of the heat-resistant polymer.

As described above, the heat-resistant polymer foam of the present invention has high heat resistance, uniform and fine cells and a low dielectric constant. Consequently, the foam can be utilized as, for example, an internal electrical insulator, cushioning material, heat insulator or circuit substrate for electronic appliances and other devices while taking advantage of excellent properties inherent in the heat-resistant polymer, such as heat resistance, mechanical properties, wearing resistance and high resilience. The foam is especially suitable for use as a thin sheet.

The foam substrate of the present invention can be produced by forming a metal foil layer on one or each side of a foamed resin layer comprising the heat-resistant polymer foam. Although the metal foil is not particularly limited, foils generally used include a stainless steel foil, copper foil, aluminum foil, copper-beryllium foil, phosphorus-bronze foil and iron-nickel alloy foil. Methods for forming a metal foil layer are not particularly limited, and examples thereof include (1) a method in which a resin layer to be foamed is formed on a substrate comprising a metal foil and then foamed, and (2) a method in which a foamed resin layer is produced first and is then metallized by a conventional technique, e.g., sputtering, electroplating or electroless plating. Two or more techniques may be used in combination. The foam substrate thus obtained is useful as a circuit substrate.

The heat-resistant polymer foam of the present invention has excellent heat resistance, a low relative density and an exceedingly small cell size. Furthermore, the foam can have a reduced dielectric constant because the resin has cells therein.

According to the process of the present invention, a heat-resistant polymer foam having such excellent properties can easily be obtained efficiently.

According to the foam substrate of the present invention, since the cell size of the foam is exceedingly small, not only a fine pattern can be formed in the metal foil, but also chemicals such as a resist, an etchant and a stripping fluid are difficult to infiltrate into the fine cells during the processing for pattern formation. Consequently, high electrical reliability is obtained.

The present invention will be explained in detail below by reference to the following Examples, but the invention should not be construed as being limited to those Examples in any way.

The modulus of elasticity, sectional structure and dielectric constant of each sheet were determined or examined by the following methods.

Determination of Modulus of Elasticity

Using DMS-210, manufactured by Seiko Instruments Inc., each sheet was heated at a temperature rising rate of 5° C./min with vibration at 10 Hz in the air to obtain a curve of storage elastic modulus (E') for the sheet. The value of that modulus was taken as modulus of elasticity.

Examination of Sheet Structure

Each foamed sheet produced was frozen with liquid nitrogen and then broken. A section resulting from the breakage was examined with a scanning electron microscope (SEM; Hitachi S-570) at an accelerating voltage of 10 kV.

Determination of Dielectric Constant

The dielectric constant of each sheet was determined with HP 4248A Precision LCR Meter, manufactured by Yokokawa Hewlett-Packard Co., Ltd.

Synthesis Example

Synthesis of Polyimide Precursor [BPDA/PDA]

27 g of p-phenylene diamine (PDA) was introduced into a 500 ml separable flask equipped with a stirrer and a thermometer. 392 g of N-methyl-2-pyrrolidone (NMP) was added to the flask. The contents in the flask were stirred to dissolve the PDA. 73.5 g of 3,3',4,4'-biphenyltetracarboxylic dianhydride (BPDA) was gradually introduced into the flask. The contents in the flask were then continuously stirred at a temperature of 30° C. or lower for 2 hours to obtain a polyimide resin precursor solution having a concentration of 20% by weight. This polyimide resin precursor solution had an intrinsic viscosity (as measured at 30° C. in NMP at a concentration of 0.5 g/100 ml) of 1.5 and a solution viscosity at 30° C. of 800 Pa·s.

EXAMPLE 1

A 188 $\mu$m thick polyether imide film (Superio UT Type F; manufactured by. Mitsubishi Plastics Industries Ltd.; $T_g$, 226° C.) was cut into a circular sheet having a diameter of 870 mm. This sheet was placed in a 500 cc pressure vessel and maintained for 1 hour in a carbon dioxide atmosphere having a temperature of 40° C. and a pressure of 25 MPa to thereby impregnate the sheet with carbon dioxide. After the pressure was reduced to atmospheric pressure, the sheet was immediately immersed in a 200° C. oil bath for 30 seconds to grow cells, rapidly taken out of the bath and then quenched with ice water. Thus, a heat-resistant foam made of the polyether imide was obtained. This foam had a density of 0.684 g/cm$^3$ and an average cell diameter as determined from an SEM image of 0.13 $\mu$m. The sheet, before being foamed, had a modulus of elasticity at 200° C. of $1.8 \times 10^9$ Pa.

EXAMPLE 2

A 188 $\mu$m thick polyether imide film (Superio UT Type F; manufactured by Mitsubishi Plastics Industries Ltd.; $T_g$, 226° C.) was cut into a circular sheet having a diameter of 80 mm. This sheet was placed in a 500 cc pressure vessel and maintained for 30 minutes in a carbon dioxide atmosphere having a temperature of 40° C. and a pressure of 25 MPa to thereby impregnate the sheet with carbon dioxide. After the pressure was reduced to atmospheric pressure, the sheet was immediately immersed in a 200° C. oil bath for 30 seconds to grow cells, rapidly taken out of the bath and then quenched with ice water. Thus, a heat-resistant foam made of the polyether imide was obtained. This foam had a density of 0.769 g/cm$^3$ and an average cell diameter as determined from an SEM image of 1.2 $\mu$m.

EXAMPLE 3

The polyimide resin precursor solution obtained in Synthesis Example was applied with an applicator to an Alloy 42 foil having a thickness of 20 $\mu$m. The coating was pre-dried in a circulating hot-air drying oven at 150° C. for 1 hour. This film layer was heated first at 200° C. for 30 minutes and then at 250° C. for 30 minutes to thereby produce a sheet composed of the aluminum foil and a polyimide film layer formed thereon. This polyimide had a glass transition point ($T_g$) of 180° C. or higher.

The sheet thus produced was cut into a 50×50 mm size. This cut sheet was placed in a 500 cc pressure vessel and maintained for 90 minutes in a carbon dioxide atmosphere having a temperature of 40° C. and a pressure of 25 MPa to thereby impregnate the sheet with carbon dioxide. After the pressure was reduced to atmospheric pressure, the sheet was immediately immersed in a 300° C. oil bath for 30 seconds to grow cells, rapidly taken out of the bath and then quenched with ice water. Thus, a sheet composed of the aluminum foil and, formed thereon, a heat-resistant foam made of the polyimide was obtained. This foam had a density of 1.16 g/cm$^3$ and an average cell diameter as determined from an SEM image of 0.057 $\mu$m. The sheet, before being foamed, had a modulus of elasticity at 300° C. of $4.0 \times 10^9$ Pa.

EXAMPLE 4

A polyether imide (Ultem 1000, manufactured by General Electric Co.) was dissolved in methylene chloride in an amount so as to be a concentration of 20% by weight. This solution was spread on a 35 $\mu$m thick rolled copper foil in a thickness of 30 $\mu$m. The coating was pre-dried at 80° C. for 30 minutes and then heated in a nitrogen atmosphere at 200° C. for 30 minutes to obtain a polyether imide/copper substrate. This substrate was cut into a circular sheet having a diameter of 80 mm. This sheet was placed in a 500 cc pressure vessel and maintained for 30 minutes in a carbon dioxide atmosphere having a temperature of 40° C. and a pressure of 25 MPa to thereby impregnate the sheet with carbon dioxide. After the pressure was reduced to atmospheric pressure, the sheet was immediately immersed in a 200° C. oil bath for 30 seconds to grow cells, rapidly taken out of the bath and then quenched with ice water. Thus, a heat-resistant foam substrate composed of the polyether imide and the copper foil was obtained. The copper foil of the foam substrate was removed by etching, and the density of the resin was measured. As a result, the resin density was found to be 0.77 g/cm$^3$. The foamed resin had an average cell diameter as determined from an SEM image of 1.3 $\mu$m and a dielectric constant $\epsilon$ of 2.2 (1 MHz).

Comparative Example 1

A 188 $\mu$m thick polyether imide film (Superio UT Type F; manufactured by Mitsubishi Plastics Industries Ltd.; $T_g$, 226° C.) was cut into a circular sheet having a diameter of 80 mm. This sheet was immersed in dichloromethane at room temperature. After 1 hour, the sheet was taken out. This sheet was immediately immersed in a 200° C. oil bath for 30 seconds to grow cells, rapidly taken out of the bath and then quenched with ice water. Thus, a heat-resistant foam made of the polyether imide was obtained. This foam had a density of 0.771 g/cm$^3$. However, the average cell diameter thereof as determined from an SEM image was as large as 88 μm, and the cells had extremely poor uniformity in structure.

Comparative Example 2

A polyether imide (Ultem 1000, manufactured by General Electric Co.) was dissolved in methylene chloride in an amount so as to be a concentration of 20% by weight. This solution was spread on a 35 μm thick rolled copper foil in a thickness of 30 μm. The coating was pre-dried at 80° C. for 30 minutes and then heated in a nitrogen atmosphere at 200° C. for 30 minutes to obtain a polyether imide/copper substrate. This substrate was cut into a circular sheet having a diameter of 80 mm. This sheet was immersed in a 200° C. oil bath for 30 seconds, rapidly taken out of the bath and then quenched with ice water. Thus, a substrate composed of the polyether imide and the copper foil was obtained. The copper foil of this substrate was removed by etching, and the density of the resin was measured. As a result, the resin density was found to be 1.27 g/cm$^3$. No cells were observed on an SEM image. The resin layer had a dielectric constant ε of 3.4 (1 MHz).

As is apparent from the above, the heat-resistant polymer foams obtained in the Examples each had a cellular structure having a cell size of from 0.01 μm to less than 10 μm.

What is claimed is:

1. A process for producing a heat-resistant polymer foam which comprises impregnating a heat-resistant polymer selected from the group consisting of polyimides, polyimide precursors and polyether imides, with a non-reactive gas under a pressure of 7.4 to 100 MPa, reducing the pressure, and then heating the impregnated polymer at a temperature exceeding 120° C. to foam the polymer so that the polymer foam has an average cell diameter of 0.01 to 1.3 μm, wherein the heating for foaming is conducted at a temperature at which the heat-resistant polymer in an unfoamed state has a modulus of elasticity of 1×10$^7$ Pa or higher.

2. The process for producing a heat-resistant polymer foam as claimed in claim 1, wherein the non-reactive gas is carbon dioxide.

3. The process for producing a heat-resistant polymer foam as claimed in claim 1, wherein the non-reactive gas with which the heat-resistant polymer is impregnated is used in a supercritical state.

4. A foam substrate comprising:

a foamed resin layer comprising a hear-resistant polymer foam comprising a heat-resistant polymer, said foam, having an average cell diameter of from 0.01 μm to 1.3 μm and having been obtained by the process as claim 4, and a metal foil layer formed on at least one side of the resin layer.

* * * * *